UNITED STATES PATENT OFFICE.

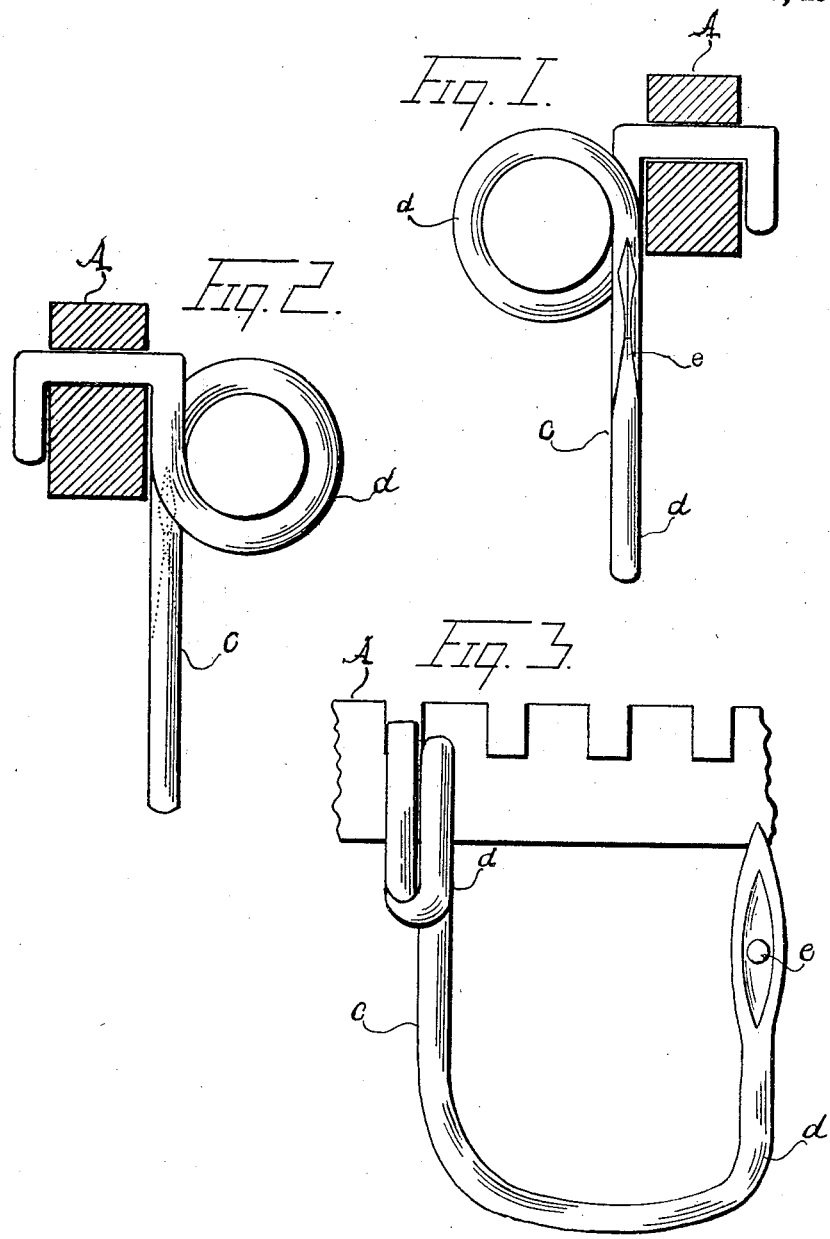

MAX FAISTENHAMMER, OF BINGHAMTON, NEW YORK.

MEAT-HOOK.

1,354,811.  Specification of Letters Patent.  Patented Oct. 5, 1920.

Application filed April 12, 1920. Serial No. 373,139.

*To all whom it may concern:*

Be it known that I, MAX FAISTENHAMMER, a citizen of the United States, residing at Binghamton, in the county of Broome and State of New York, have invented certain new and useful Improvements in Meat-Hooks, of which the following is a specification.

My invention relates particularly to improvements in meat hooks for the suspension of hams and similar products from the meat stocks, and is to provide a hook which can be positioned along the rail and remain in a fixed position, and which will permit when the hook is removed of simultaneously passing through the ham a cord for looping, to make the ham ready for the trade without additional labor therefor or the expenditure of time; also a hook adapted to hang in a spaced notch on the rail, also a hook which will afford handle means for firmly grasping the hook for lifting the weight to the rail or removal from the rail, or carrying the weighted hook to the rail and hanging it, without the danger of the fingers being caught and pinched, in the manipulation of the weighted hook. With these objects in view my invention consists of certain novel features of construction and arrangement of parts as will be hereinafter more fully described and pointed out in the claims, reference being had to the accompanying drawings, in which Figure 1 is a front view in perspective, of my device.

Fig. 2 is a rear view, in perspective of my device.

Fig. 3 is a side view in perspective of my device.

The same reference characters denote like parts in each of the several figures in the drawings.

In the drawing A designates the notched rail or rod, from which the hooks are suspended, and *b* a cross sectional view of a notch to receive the hook.

In carrying out my invention I have the hook formed with the usual shank *c* and the sharpened hook portion *d* extending to a point, and somewhat flattened toward the point, and through the flattened point of the hook, the eye *e* and through which eye, *e*, I may pass a cord of any suitable description; the shank *c* rebends in vertical curved formation *d* forming a circle, and thence is projected into the rectangular rebend *e* shown in Figs. 1 and 2.

The structure shown may be produced from an integral piece of wire or rounded iron rod; but the rectangular rebend *e* is fashioned in rectangular form. The circular loop or rounded curved formation *d* affords a handle for lifting the burdened hook into its notch in place upon the rod, or for removing it from its place upon the rod, when burdened. When I remove the hook from the ham, the cord before mentioned, drawn through the eye *e* is drawn through the ham, ready for tying in a loop for trade purposes.

Having thus described my invention, what I claim as new and for which I desire Letters Patent is as follows:

1. In a hook as herein described, for hanging hams or other meat, comprising a shank having its upper portion rebent in rectangular formation, and adapted to fit over a rectangular rail, while its shank is projected into a rebent circular formation parallel with the shank, forming a circle, thence projecting into a curved flattened point with an eye through the hook point adapted to receive a tie cord.

2. A hook for hanging hams or other meats comprising a shank having its upper portion bent in a rectangular formation and adapted to fit over a rectangular support with the intermediate portion of the shank bent into a circular loop adapted to serve as a finger hold, the shank after leaving the loop extending downwardly and then bent at an angle to the plane of the loop with its end bent upwardly and terminating in a flattened penetrating prong provided with an eye for threading a cord through the ham or other pieces of meat.

In testimony whereof I have affixed my signature.

MAX FAISTENHAMMER.